(12) United States Patent
Sawada et al.

(10) Patent No.: US 9,300,179 B2
(45) Date of Patent: Mar. 29, 2016

(54) ELECTRIC ROTATING MACHINE

(71) Applicant: Hitachi Automotive Systems, Ltd., Hitachinaka-shi, Ibaraki (JP)

(72) Inventors: Itsuro Sawada, Tokyo (JP); Hiroshi Hamano, Hitachinaka (JP); Taisuke Ikeda, Hitachinaka (JP); Yasuyuki Saito, Hitachinaka (JP); Yuji Kano, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/379,437

(22) PCT Filed: Feb. 1, 2013

(86) PCT No.: PCT/JP2013/052301
§ 371 (c)(1),
(2) Date: Aug. 18, 2014

(87) PCT Pub. No.: WO2013/132935
PCT Pub. Date: Sep. 12, 2013

(65) Prior Publication Data
US 2015/0022050 A1 Jan. 22, 2015

(30) Foreign Application Priority Data
Mar. 9, 2012 (JP) ................................. 2012-052468

(51) Int. Cl.
*H02K 3/30* (2006.01)
*H02K 3/34* (2006.01)
*H02K 3/52* (2006.01)

(52) U.S. Cl.
CPC .. *H02K 3/30* (2013.01); *H02K 3/34* (2013.01); *H02K 3/522* (2013.01)

(58) Field of Classification Search
CPC .......... G02K 3/30; G02K 3/34; G02K 3/522; H02K 3/30; H02K 3/34; H02K 3/522; H02K 3/38; H02K 3/32; H02K 3/48; H02K 3/345; H02K 15/024; H02K 1/165
USPC .......................................................... 310/215
See application file for complete search history.

(56) References Cited

U.S. PATENT DOCUMENTS 5,346,568 A * 9/1994 Gsellmann ............. H03G 1/007
156/293
6,008,563 A * 12/1999 Baba ...................... H02K 1/146
310/194

(Continued)

FOREIGN PATENT DOCUMENTS

JP 2002-112473 A 4/2002
JP 2003-32921 A 1/2003

(Continued)

OTHER PUBLICATIONS

Corresponding International Search Report dated May 14, 2013 with English Translation (two (2) pages).

*Primary Examiner* — Dang Le
*Assistant Examiner* — Leda Pham
(74) *Attorney, Agent, or Firm* — Crowell & Moring LLP

(57) ABSTRACT

An electric rotating machine having high cooling performance is provided. The electric rotating machine is configured to include a rotor rotating around a rotational axis; and a stator disposed to face the circumferential surface of the rotor. The stator includes a stator core having a cylindrical core back and a plurality of teeth radially extending from the core back, and a stator coil wound around the teeth in concentrated winding via an insulation material. A spacer having electric insulation performance is attached between the stator coils each wound around the respective teeth adjacent to each other. The spacer has a coefficient of linear expansion greater than that of the stator core.

4 Claims, 8 Drawing Sheets

(56) References Cited

U.S. PATENT DOCUMENTS

| | | | |
|---|---|---|---|
| 6,870,292 B2 * | 3/2005 | Owada | H02K 3/24 310/194 |
| 7,919,896 B2 * | 4/2011 | Takeshita | H02K 3/487 310/214 |

FOREIGN PATENT DOCUMENTS

| | | |
|---|---|---|
| JP | 2006-211821 A | 8/2006 |
| JP | 2007-221925 A | 8/2007 |
| JP | 2007-252149 A | 9/2007 |

* cited by examiner 112  111
DURING ASSEMBLY
(AT NORMAL TEMPERATURE)

DURING OPERATION
(AT HIGH TEMPERATURE)

F I G . 9
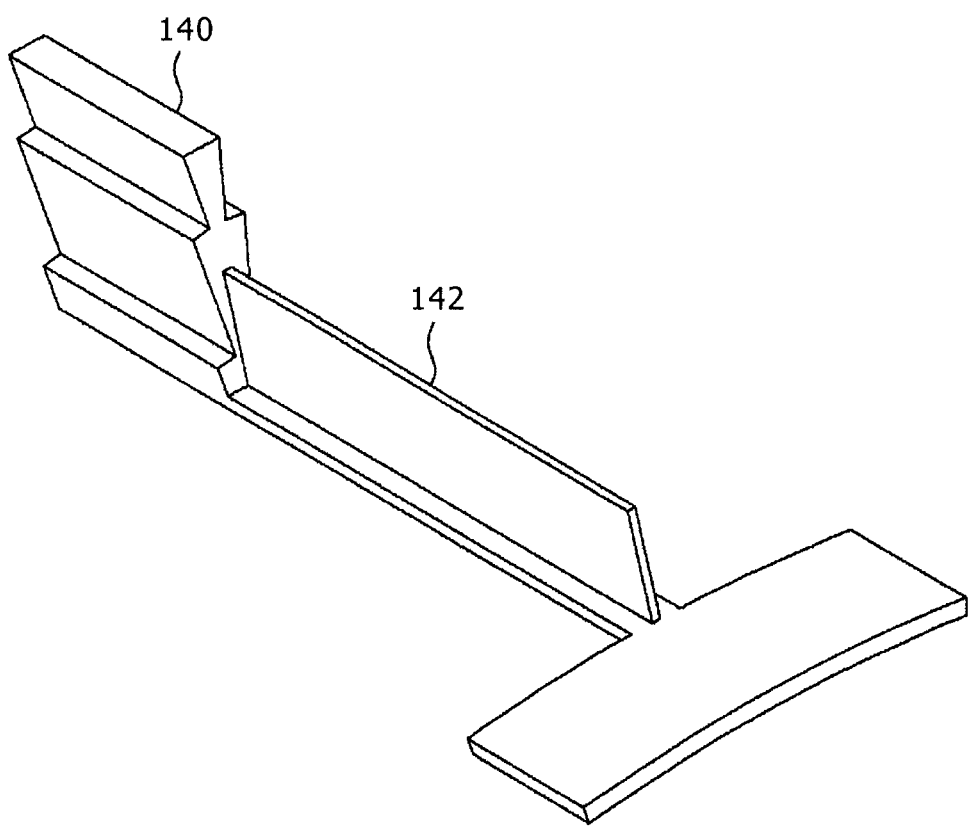

ELECTRIC ROTATING MACHINE

TECHNICAL FIELD

The present invention relates to an electric rotating machine.

BACKGROUND ART

An electric rotating machine has a stator and a rotor. The stator has a stator core around which a stator coil is wound. The rotor is opposed to the stator via an air gap and rotates around a rotational axis. If the electric rotating machine is operated as a motor, an alternating current is transmitted to the stator coil to generate a rotating magnetic field, thereby applying rotating force to the rotor to provide mechanical output. If the electric rotating machine is operated as a generator, rotating force is applied to the rotor from the outside to rotate the rotor, thereby providing electric output generated in the stator coil.

When the electric rotating machine is operated as the motor or the generator to provide the mechanical output or the electric output, respectively, as described above, the stator coil and the stator core produce heat due to losses in the electric rotating machine. An insulation material for the electric rotating machine has an upper limit temperature up to which insulation performance can be kept. When the electric rotating machine is operated, it is necessary to cool the electric rotating machine with the use of any method so as to prevent the insulation material from exceeding the upper limit temperature.

If methods for cooling an electric rotating machine are classified depending on a medium used for cooling, they are divided into a gas cooling method which uses air or hydrogen as a cooling medium and a liquid cooling method which uses cooling water or cooling oil as a cooling medium. Of these the liquid cooling method can be classified into an indirect cooling method and a direct cooling method. In the indirect cooling method, a housing which is provided with a cooling liquid passage on the outside diameter side or inside diameter side of a stator core is installed and the stator core and the stator coil are cooled via the housing. In the direct cooling method, an electrical insulation liquid such as oil is used as a cooling medium and is brought into direct contact with the stator core and the stator coil, which are heat generating portions, for cooling them.

Incidentally, electric rotating machines can be classified into distributed winding and concentrated winding according to the stator coil winding method. Of these the electric rotating machine of the concentrated winding type is configured such that a stator coil is wound via an insulation material around the teeth of the stator core composed of laminated steel plates.

In general, the teeth of a stator core have a rectangle in cross-section; therefore, if a stator coil is wound around the teeth, the bending radius of the coil is increased. Thus, a gap occurs between the teeth and the insulation material or between the insulation material and the coil. This gap is occupied by varnish used to secure the coil or by an air layer. However, since the varnish and air have low thermal conductivity, thermal resistance between the coil and the teeth is increased because of the occurrence of the gap, which degrades cooling performance.

Technologies to solve such a problem are disclosed in e.g. patent documents 1 and 2. Patent document 1 intends to bring a stator coil into close contact with an insulation material by changing the thickness of the insulation material depending on positions to conform the cross-sectional shape of the insulation material to the bending radius of the coil. In patent document 2, the insulation material (the insulation material in the text of patent document 2) is provided with a thin portion and another insulation material is inserted into the thin insulation material portion so as to be held between the coils adjacent to each other. In this way, the coils are intended to be pressed against the thin portions of the insulation materials.

PRIOR-ART DOCUMENTS

Patent Documents

Patent document 1: JP-2006-211821-A
Patent document 2: JP-2007-221925-A

SUMMARY OF THE INVENTION

Problem to be Solved by the Invention

Since, in patent document 1, the thickness of the insulation material is changed depending on positions, the insulation material is made partially thicker than the thickness necessary for electric insulation performance. In general, materials used for an insulation material is low in thermal conductivity. Therefore, if the insulation material has a thickness greater than the thickness necessary for electric insulation performance, then sufficient cooling performance may be hard to obtain.

Also in patent document 2, likewise the thickness of the insulation material is changed depending on positions and another insulation material is inserted into the thin insulation material portion. To ensure electric insulation performance even at the thin insulation material portion, the other portion of the insulation material is relatively thicker than the thickness sufficient for keeping the electric insulation performance. Thus, sufficient cooling performance may be hard to obtain.

An object of the present invention is to provide an electric rotating machine that can improve cooling performance and maintain insulation quality.

Means for Solving the Problem

To solve the above problem, for example, the configurations described in claims are adopted. The present application includes a plurality of means for solving the above problem. One example of such means is given. An electric rotating machine of concentrated winding includes a rotor rotating around a rotational axis; and a stator disposed to face a circumferential surface of the rotor. The stator includes a stator core having a cylindrical core back and a plurality of teeth radially extending from the core back, and a coil wound around the teeth via an insulation material for electric insulation. The electric rotating machine includes a spacer with electric insulation attached between the stator coils wound around the corresponding teeth adjacent to each other. The spacer has a coefficient of linear expansion greater than that of the stator core.

Effect of the Invention

The present invention can improve the cooling performance of the electric rotating machine. In addition, the present invention can provide the electric rotating machine that has the same size as that of the traditional one but offers output power greater than that of the traditional one.

BRIEF DESCRIPTION OF THE DRAWINGS

FIG. 9 is a perspective view of a spacer (a fifth embodiment).

MODE FOR CARRYING OUT THE INVENTION

Embodiments will hereinafter be described with reference to the drawings.

[First Embodiment]

An electric rotating machine of a first embodiment is described with reference to FIGS. 1 to 4 and 11.

Figure 11:
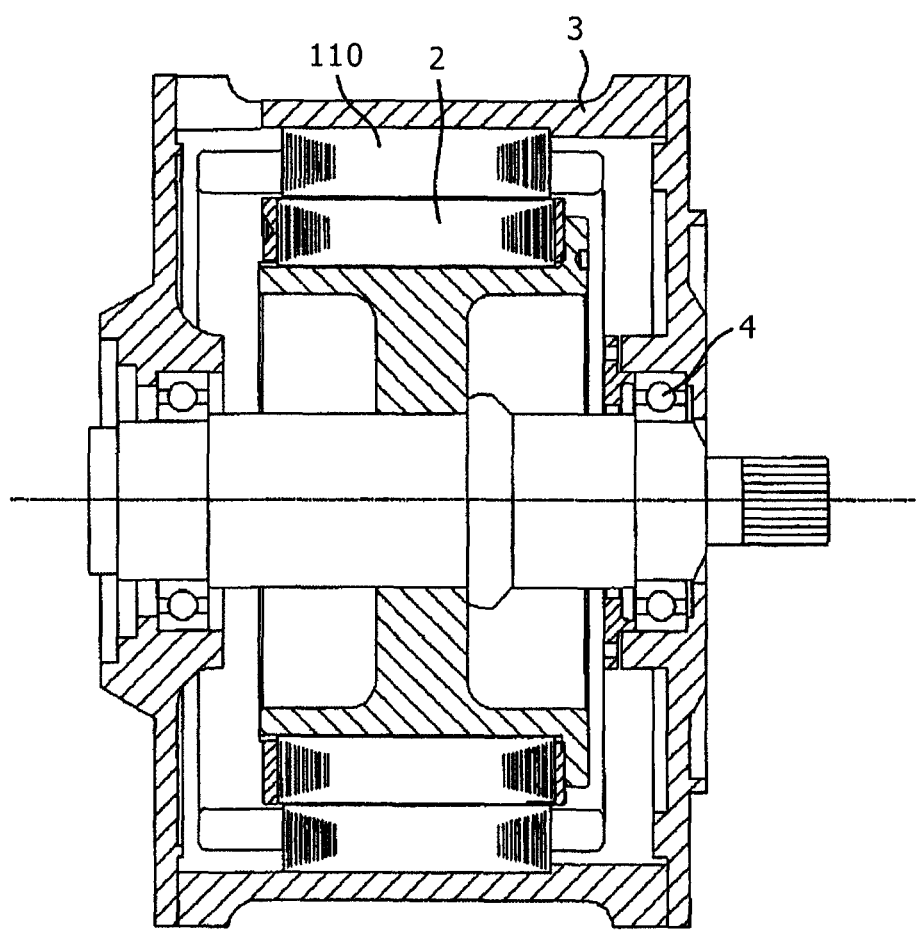
FIG. 11 is a cross-sectional view of an electric rotating machine.

FIG. 11 is a schematic cross-sectional view of the electric rotating machine of the present embodiment. The electric rotating machine of the present embodiment includes a stator 110, a rotor 2 carried by bearings 4, and a housing 3 for holding the stator 110.

Figure 1:
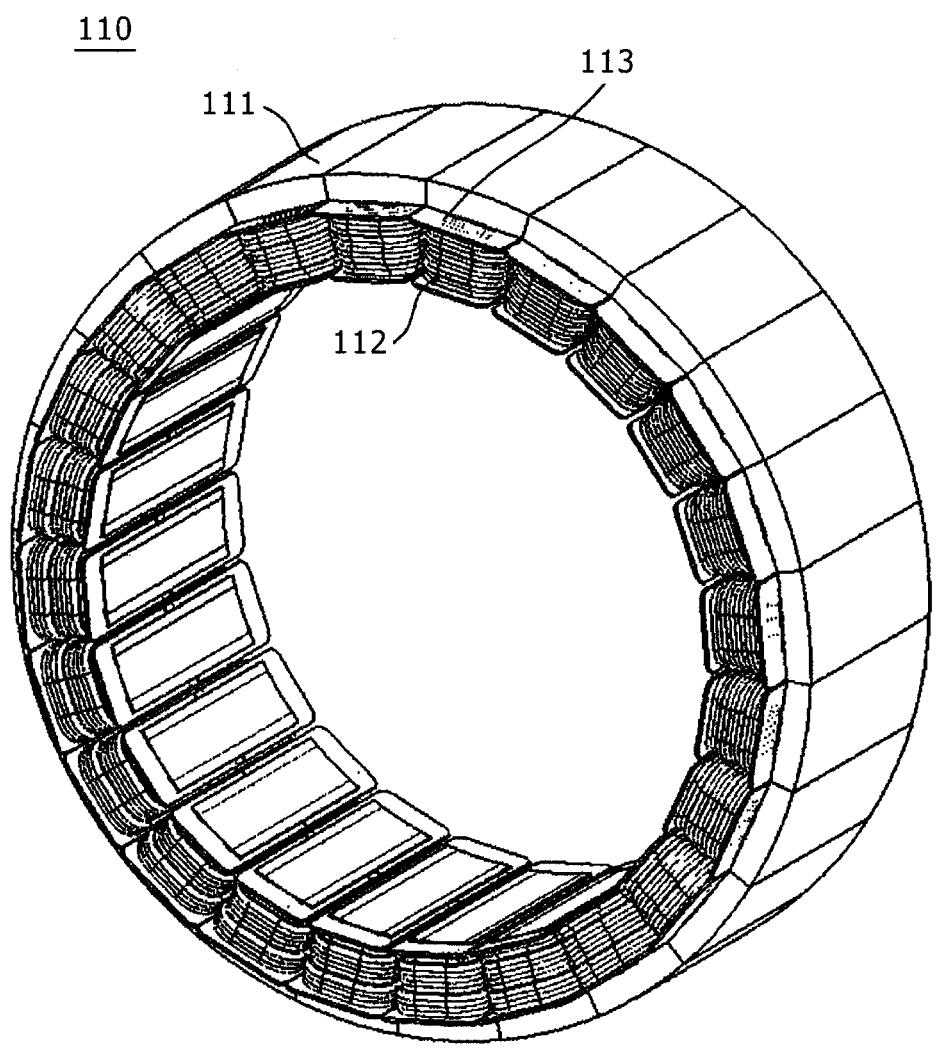
FIG. 1 is a perspective view of a stator of an electric rotating machine.
Figure 2:
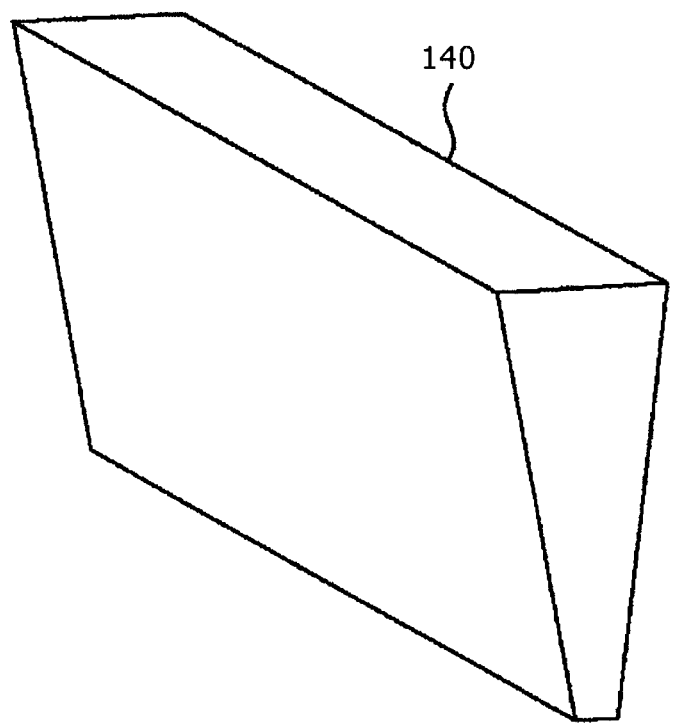
FIG. 2 is a perspective view of a spacer (a first embodiment).

As illustrated in FIG. 1, the stator 110 includes a stator core 111 formed by laminating magnetic steel plates formed of thin plates; stator coils 112; and insulation materials 113 for electrically insulating the stator core 111 and the stator coil 112 from each other.

Figure 3:
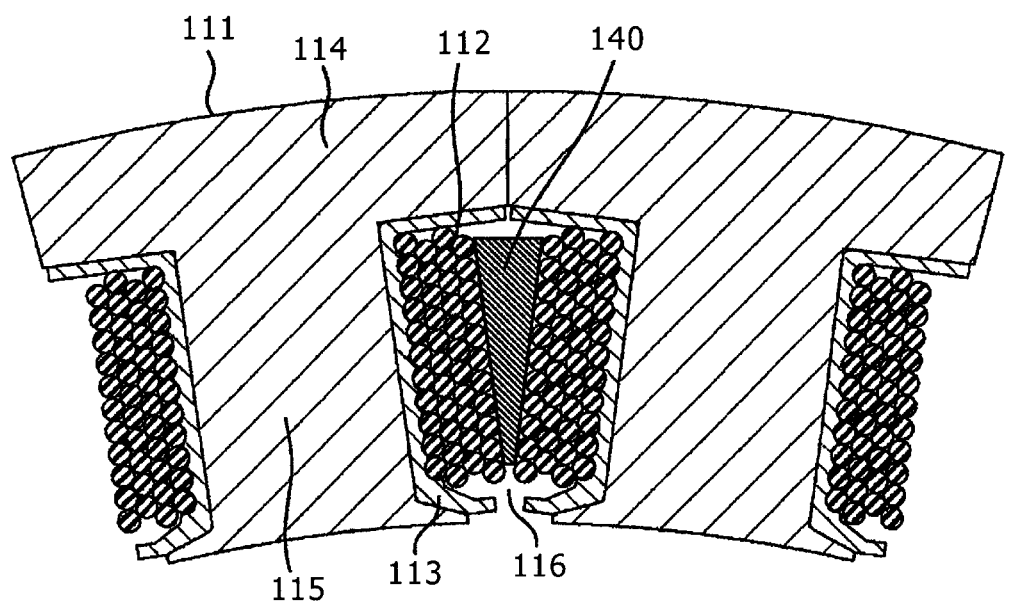
FIG. 3 is a cross-sectional view taken along a direction perpendicular to a rotational axis of the stator (the first embodiment).
Figure 4:
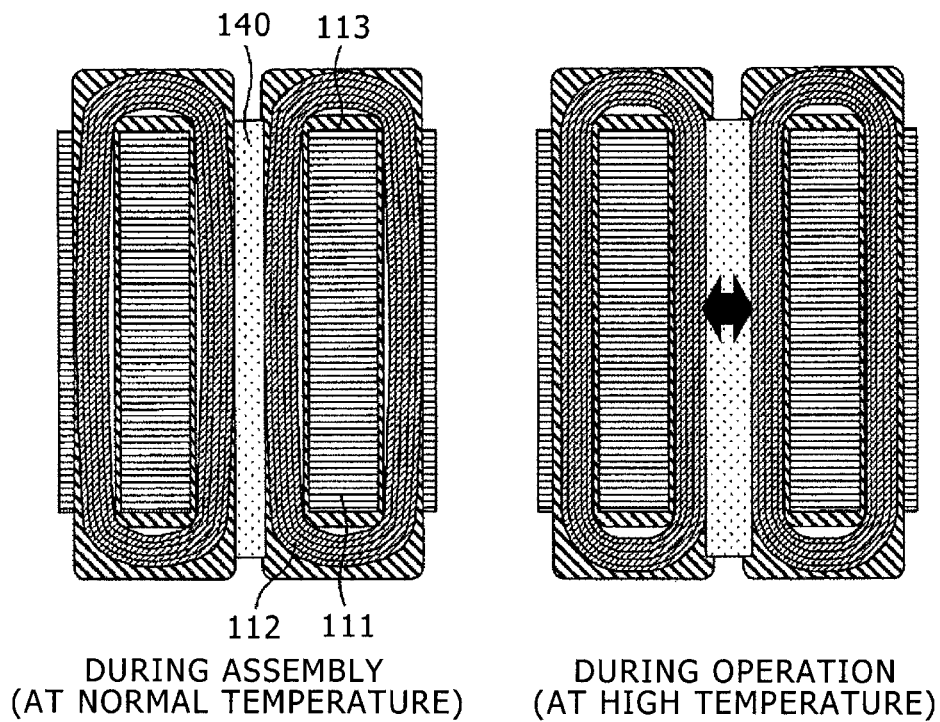
FIG. 4 includes cross-sectional views taken along a radial direction of the electric rotating machine (the first embodiment).

As illustrated in FIG. 3, the stator core 111 composed of a cylindrical core back 114 and teeth 115 radially extending from the core back 114 is configured such that a stator coil 112 is inserted into a slot 116, which is a clearance between the teeth 115 adjacent to each other, and wound around the tooth 115.

A spacer 140 is installed in the slot 116 at a position between the stator coils 112 adjacent to each other. The spacer 140 is made of a material that has electric insulation and a coefficient of linear expansion greater than that of the stator core 111. The circumferential width of the spacer is set at such a size that it is slightly smaller than the clearance between the stator coils 112 adjacent to each other at the time of assembly during manufacture, so that the spacer 140 can axially be inserted into the clearance without damaging an insulation layer on the front surface of the stator coil 112. In addition, the circumferential width of the spacer is set at such a size that the spacer 140 is thermally expanded to press the stator coil 112 in a circumferential direction (in the direction of the tooth 15) when it is heated to a high temperature due to the operation of the electric rotating machine.

With this structure, during the manufacture of the electric rotating machine (during the assembly thereof), the spacer 140 can easily be inserted into the slot 116, i.e., the clearance. In addition, when the electric rotating machine 100 is operated to heat the stator core 111 and the stator coil 112 to a high temperature, the spacers 140 are thermally expanded so that the clearances between the stator coils 112 and the corresponding insulation materials 113 and the clearances between the insulation materials 113 and the corresponding teeth 115 are reduced in size. Thus, the present structure can improve cooling performance.

The present structure is applicable regardless of methods for cooling an electric rotating machine. More specifically, in an indirect cooling method in which cooling liquid is allowed to flow in a passage installed in a housing, most of heat generated in a stator coil is transmitted to a stator core and flows into the cooling liquid in the passage installed in the housing. In this case, if there is a clearance between the stator coil and an insulation material or between the insulation material and the stator core, air or varnish having a small thermal conductivity is interposed in the clearance, so that there is a possibility of not offering sufficient cooling performance. Thus, the configuration of the present invention can make small the clearances between the stator coil and the insulation material and between the insulation material and the stator core, thereby making it possible to more improve cooling performance.

In a direct cooling method in which insulating liquid such as oil is brought into contact with a stator core or a stator coil, which is a main heat source of an electric rotating machine, to cool an electric rotating machine, heat generated in the stator core is partially transmitted to the stator coil and also flows into a cooling medium (oil) along with the heat generated in the stator coil. In this case, if there are clearances between the stator coil and an insulation material and between the insulation material and the stator core, likewise cooling performance is degraded. The structure of the present invention can make small the clearances between the stator coil and the insulation material and between the insulation material and the stator core, thereby making it possible to more improve cooling performance.

[Second Embodiment]

Figure 5:
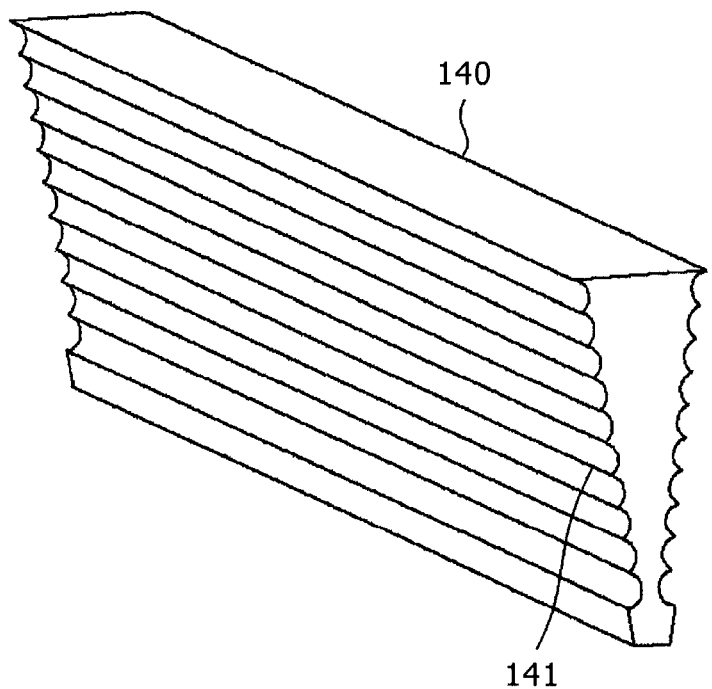
FIG. 5 is a perspective view of a spacer (a second embodiment).
Figure 6:
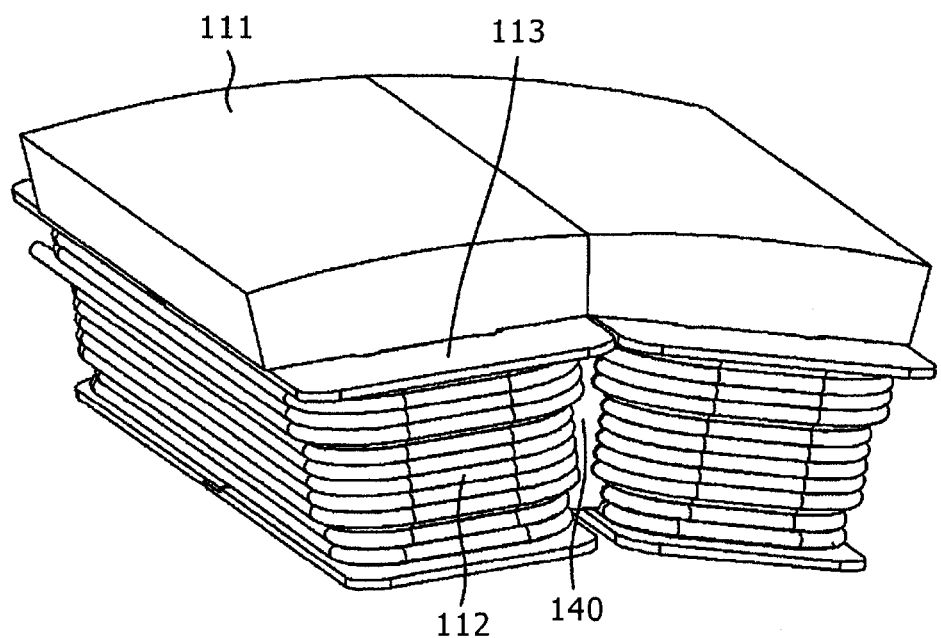
FIG. 6 is a perspective view of a stator (the second embodiment).

Another embodiment of the present invention will be described with reference to FIGS. 5 and 6.

The present invention is characterized in that the spacer 140 of the first embodiment is provided with grooves 141 in its surface with which stator coils 112 are allowed to be in contact. The grooves of the spacers 140 are paired with concavities and convexities of the surface of the outermost circumference of the stator coil 112. In this way, when the spacer 140 is inserted into the slot 116, i.e., the clearance, a possibility of damaging the surface of the stator coil 112 is reduced. In addition, when an electric rotating machine is operated to be heated to a high temperature, the stator coil 112 and the spacer 140 come into contact with each other in a wider area. Thus, the spacer 140 can press the stator coils 112 at a uniform force.

[Third Embodiment]

Figure 7:
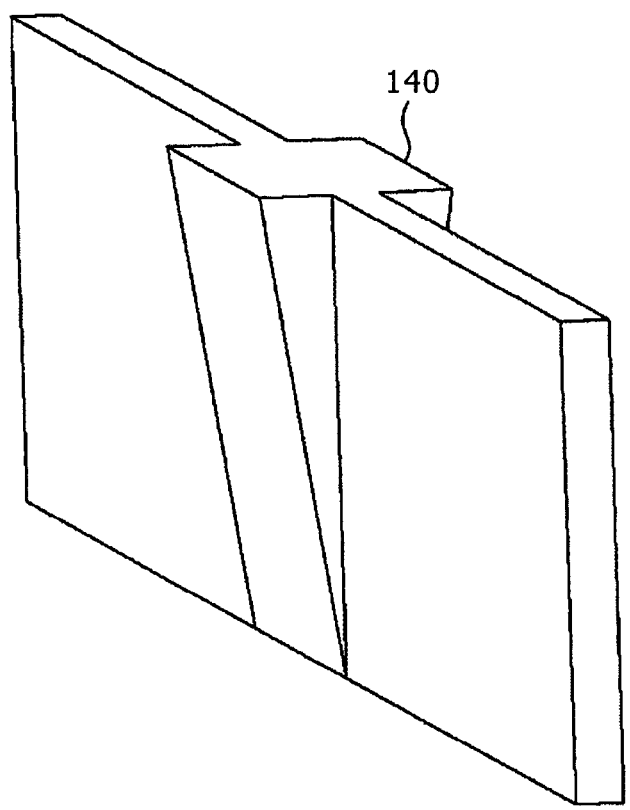
FIG. 7 is a perspective view of a spacer (a third embodiment).

Another embodiment of the present invention will be described with reference to FIG. 7.

The present embodiment is characterized in that the cross-sectional shape of the spacer 140 of the first or second embodiment is varied depending on the axial position of the electric rotational machine 100. More specifically, the present embodiment is characterized in that the spacer 140 is designed to come into contact with the stator coil 112 only in the vicinity of the axially central portion of the stator core 111. In addition, the circumferential length and radial length of the spacer 140 are reduced in the vicinity of the axial end portion other than the vicinity of the axially central portion.

With this structure, when the electric rotating machine 100 is operated and heated to a high temperature, the spacer 140 comes into contact with the stator coil 112 only in the vicinity of the axially central portion of the stator core 111. In addition, the spacer 140 presses the stator coil 112 in a circumferential direction. However, a clearance is left between the spacer 140 and the stator coil 112 in the vicinity of the axial end portion of the stator core 111.

The present embodiment is assumed to be applied to a direct cooling method in which an insulating liquid such as oil is used as a cooling medium that is brought into direct contact with the stator coil.

In order to improve the cooling performance of the direct cooling method, it is necessary to increase as much as possible an area where a cooling medium and a coil are in contact with each other. To meet the necessity, as described above, the spacer 140 and the stator coil 112 are brought into close contact with each other only at the axially central portion of the stator core 111. In addition, the clearance is left between the spacer 140 and the stator coil 112 in the other portions and the cooling medium is allowed to flow into the clearance.

With this structure, the spacer 140 is thermally expanded to press the stator coils 112 against the corresponding teeth 115 at the axially central portion where the clearance has tended to occur between the stator core 111 and the stator coil 112. In addition, the cooling medium flows in the clearance between the spacer 140 and the stator coil 112 at the axial end portion. Thus, the electric rotating machine with a high degree of cooling performance is provided.

[Fourth Embodiment]

Figure 8:
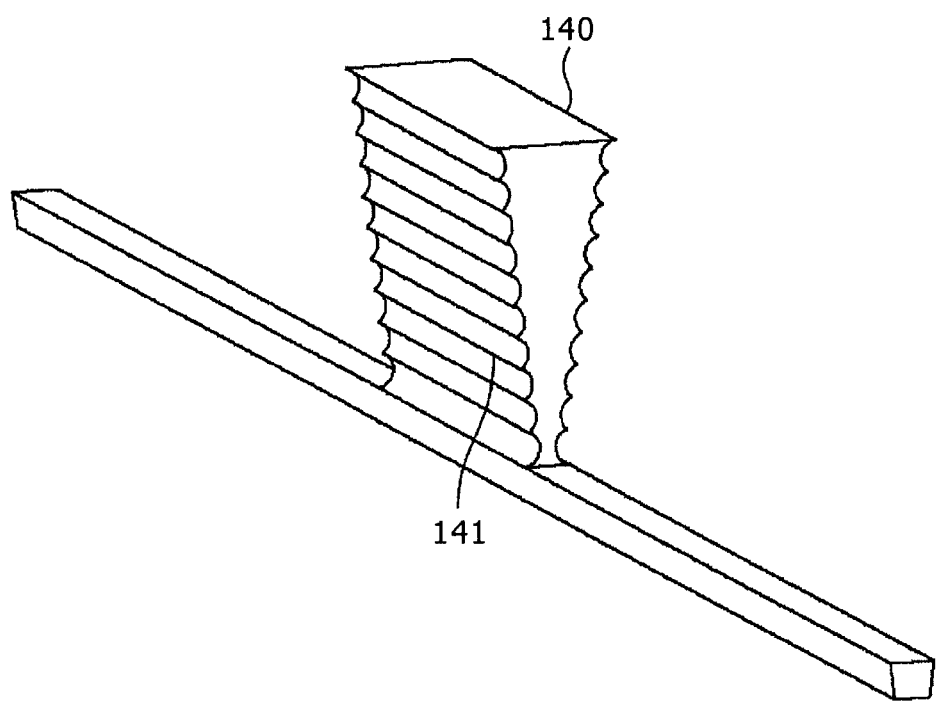
FIG. 8 is a perspective view of a spacer (a fourth embodiment).

A fourth embodiment may be structured as below as a modified example of the third embodiment. As illustrated in FIG. 8, the spacer 140 extends to the outside diameter side of the slot 116 only at an axially central portion of the stator core while the other portion thereof axially extends like a plate only on the inside diameter side of the slot. With this structure, the spacer 140 is thermally expanded to press the stator coils 112 against the corresponding teeth 115 at the axially central portion of the spacer 140. In addition, the other portions of the spacer 140 can be made to function as a guide plate adapted to lead the cooling medium from the axially end portion to the axially central portion.

As illustrated in FIG. 8, the spacer 140 may be provided with the grooves 141 as illustrated in the second embodiment.

[Fifth Embodiment]

A fifth embodiment may be structured as a modified embodiment of the fourth embodiment such that a radial rib 142 is provided at a plate-like portion of the spacer 140 other than the axially central portion thereof as illustrated in FIG. 9. According to the present structure, the strength of the plate-like portion at the axial end portion of the spacer 140 can be more increased by the rib 142. Therefore, it is possible to prevent the breakage of the spacer 140 due to vibrations occurring during the assembly or operation of the electric rotating machine.

[Sixth Embodiment]

Figure 10:
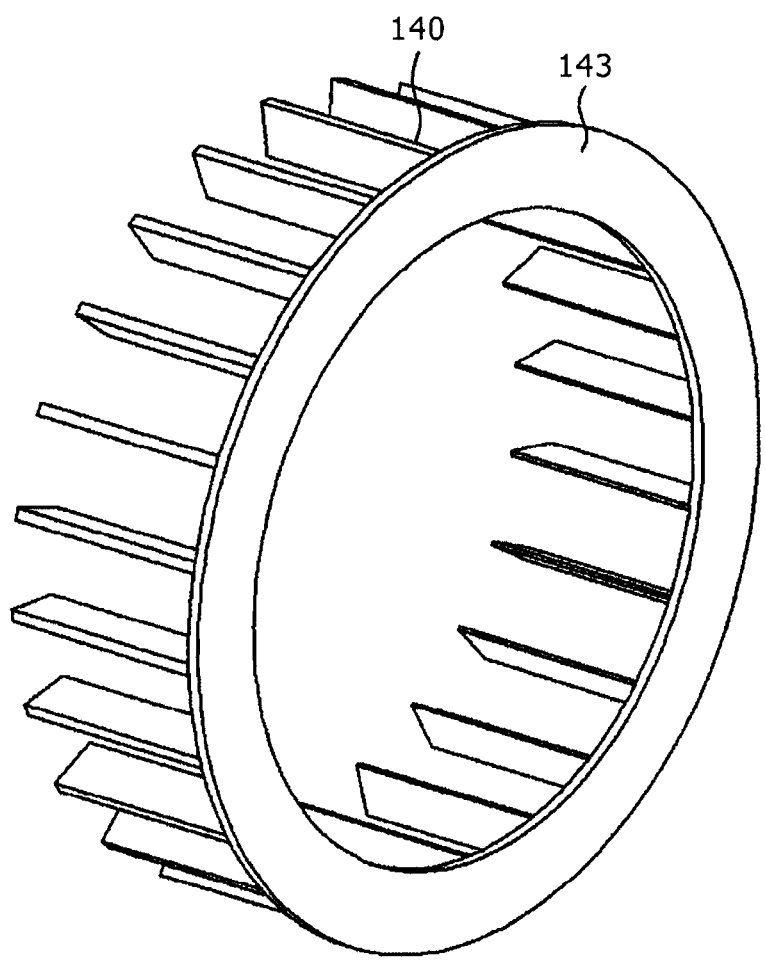
FIG. 10 is a perspective view of a spacer (a sixth embodiment).

FIG. 10 illustrates a modified example of the first to fifth embodiments. As in a sixth embodiment, a plurality of the spacers 140 illustrated in the first to fifth embodiments can be structured so as to be unified by a ring 143 at an axial end portion of the stator core. The present structure can reduce the number of the spacers 140; therefore, the number of component parts and assembly man-hours can be reduced to reduce the costs for manufacturing the electric rotating machine. In FIG. 10, the spacers 140 for all the slots of the electric rotating machine are united with the single ring 143, thereby making the spacers 140 as a single component part. However, the single component part may be divided into two or more component parts.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

EXPLANATION OF REFERENCE NUMERALS

100 Electric rotating machine
110 Stator
111 Stator core
112 Stator coil
113 Insulation material
114 Core back
115 Tooth
116 Slot
120 Rotor
140 Spacer
141 Groove

The invention claimed is:

1. An electric rotating machine, comprising:
a rotor rotating around a rotational axis; and
a stator disposed to face a circumferential surface of the rotor,
the stator including a stator core and a stator coil, the stator core having a cylindrical core back and a plurality of teeth radially extending from the core back, the stator coil being wound around the teeth in concentrated winding via an insulation material,
the electric rotating machine further comprising a spacer having electric insulation performance, the spacer being attached between the stator coils each wound around the respective teeth adjacent to each other,
wherein the spacer has a coefficient of linear expansion greater than that of the stator core,
wherein the spacer has a different circumferential length depending on axial direction of the stator core, and
wherein the circumferential length of the spacer is maximum in the vicinity of a rotational-axial center of the stator core, and the circumferential length of the spacer is less than the maximum outside of the vicinity of the rotational-axial center of the stator core.

2. The electric rotating machine according to claim 1, wherein the spacer has a coefficient of linear expansion greater than that of the stator coil.

3. The electric rotating machine according to claim 1, wherein the spacers are circumferentially connected to each other at an axial end portion of the stator core.

4. The electric rotating machine according to claim 1, wherein the spacer has a surface facing the stator coil and formed with a groove adapted to allow a side surface of the stator coil to come into close contact therewith.

* * * * *